United States Patent
Hobbet et al.

(10) Patent No.: US 7,425,810 B2
(45) Date of Patent: Sep. 16, 2008

(54) DISK DRIVE MANAGEMENT

(75) Inventors: Jeffrey R. Hobbet, Holly Springs, NC (US); Daryl Cromer, Cary, NC (US); Donald R. Frame, Apex, NC (US); Masahiko Nagai, Kanagawa (JP); Tin-Lup Wong, Chapel Hill, NC (US)

(73) Assignee: Lenovo (Singapore) Pte., Ltd., Singapore (SG)

( * ) Notice: Subject to any disclaimer, the term of this patent is extended or adjusted under 35 U.S.C. 154(b) by 89 days.

(21) Appl. No.: 11/480,291

(22) Filed: Jun. 30, 2006

(65) Prior Publication Data

US 2008/0001562 A1    Jan. 3, 2008

(51) Int. Cl.
*G05B 11/01* (2006.01)

(52) U.S. Cl. .................. 318/560; 318/561; 318/270

(58) Field of Classification Search ......... 318/560–565, 318/270, 273; 360/69, 78.04; 386/126; 711/113, 711/141

See application file for complete search history.

(56) References Cited

U.S. PATENT DOCUMENTS

| | | | |
|---|---|---|---|
| 5,481,733 A * | 1/1996 | Douglis et al. ............... 713/324 |
| 5,493,670 A * | 2/1996 | Douglis et al. ............... 713/324 |
| 5,682,273 A | 10/1997 | Hetzler |
| 5,774,292 A | 6/1998 | Georgiou et al. |
| 6,304,986 B1 * | 10/2001 | Ma et al. |
| 6,515,817 B1 * | 2/2003 | Hamaguchi et al. ...... 360/73.03 |
| 6,711,632 B1 | 3/2004 | Chow et al. |
| 6,732,241 B2 | 5/2004 | Riedel |
| 6,836,824 B1 | 12/2004 | Mirov et al. |
| 6,892,313 B1 | 5/2005 | Codilian et al. |
| 6,906,889 B2 * | 6/2005 | Hamaguchi et al. ...... 360/78.04 |
| 6,934,801 B2 | 8/2005 | Takai |
| 6,950,902 B2 | 9/2005 | Sakai et al. |
| 6,965,763 B2 | 11/2005 | Bussan et al. |
| 6,965,967 B2 | 11/2005 | Takaichi |
| 7,106,540 B1 * | 9/2006 | Hobbet et al. ............. 360/73.03 |
| 7,283,319 B2 * | 10/2007 | Hobbet et al. ................. 360/75 |
| 2002/0191328 A1 * | 12/2002 | Hamaguchi et al. ...... 360/78.04 |
| 2003/0235408 A1 * | 12/2003 | Silvester et al. ............. 386/126 |
| 2004/0003223 A1 * | 1/2004 | Fortin et al. .................... 713/1 |
| 2005/0138296 A1 * | 6/2005 | Coulson et al. ............. 711/141 |
| 2005/0144377 A1 * | 6/2005 | Grover et al. ............... 711/113 |
| 2005/0144378 A1 * | 6/2005 | Grover ........................ 711/113 |
| 2005/0195514 A1 * | 9/2005 | Bruner et al. ................. 360/69 |
| 2006/0248387 A1 * | 11/2006 | Nicholson et al. ............. 714/22 |

* cited by examiner

*Primary Examiner*—Paul Ip
(74) *Attorney, Agent, or Firm*—Ference & Associates LLC

(57) ABSTRACT

Arrangements and methods for implementing a "spin-down policy" for HDD motors that is "smart", flexible and admirably achieves an objective of ensuring prolonged motor life as just discussed. To this end, one specific implementation involves (among other things) the addition of a dedicated cache that acts as a buffer element of sorts for writing or obtaining data during a period when a motor may be spun down, especially (but not necessarily exclusively) in instances when a notebook needs to be running for a large portion of the day. Other analogous implementations are of course possible that would achieve similar ends.

17 Claims, 3 Drawing Sheets

DISK DRIVE MANAGEMENT

FIELD OF THE INVENTION

The present invention relates to hard disk drives, such as may be found on notebook or other computers, and to arrangements for controlling hard disk drives.

BACKGROUND OF THE INVENTION

Notebook or laptop computers (or "notebooks") have found increasing use since their humble beginnings. Whereas at one time they were looked upon as devices for occasional or even recreational use, their vastly increased computing power and sophistication, as developed over the past several years, has led to their being used in place of, and not just as a supplement to, desktop computers. Technology has even progressed to the stage where in the context of many working environments, system maintenance on notebooks can be performed remotely, along with other scheduled tasks, in the absence of a user. It is even the case that in many companies, employees are instructed to leave their notebooks installed in a docking station and powered on at all times (i.e., "24/7").

Accordingly, the direct physical demands placed on notebooks have increased in direct step with the trends just mentioned. This is particularly an acute issue when considering that hard disk drive (HDD) motors, and their very mechanical power, are constrained by space limitations imposed by notebooks. Thus, whereas desktops or other computers have greater space available, the space available in notebooks places design constraints on the use of fluid dynamic bearing (FDB) motors for HDD's. FDB motors use an oil-like fluid that is pumped into the thrust bearing by spiral or herringbone grooves, creating a pressure that lifts the thrust bearing off of the thrust plate and allows the motor to spin with very little friction. While this normally works very effectively for notebooks undergoing moderate or reasonable use, there is an all too well known failure condition encountered in the face of long periods of continuous motor operation. Particularly, after very long periods (typically several hundred hours) of continuous use, small air bubbles can form in the oil and cause excess cavitation. If this condition continues it can lead to more friction and eventually keep the motor from being able to maintain spin speed properly.

In the light of greatly increased notebook use, the condition has become so widely known and prevalent that the generally accepted remedy (or "preventative cure") is to "spin" the motor "down" (i.e., disable the motor) on a regular basis. In an everyday, consumer-oriented notebook environment, this will typically happen anyway through system suspend as the notebook is being transported, or through system shutdown when it is simply not in use. But the industrial applications mentioned above, where notebooks are often running at literally all hours of the day, require a concerted approach to imposing spin-downs on a regular basis.

Notwithstanding the air bubble issue mentioned above, there are other design concerns with FDB motors which may be addressed by periodic spin-downs. Such concerns include an overall wear life concern.

Accordingly, a need has been recognized in connection with facilitating spin-downs of HDD motors in a notebook environment in an unobtrusive and convenient manner that will ensure optimal conditions for prolonging HDD motor life and avoiding problems such as cavitation as discussed above.

SUMMARY OF THE INVENTION

There is broadly contemplated herein, in accordance with at least one presently preferred embodiment of the present invention, arrangements and methods for implementing a "spin-down policy" for HDD motors that is "smart", flexible and admirably achieves an objective of ensuring prolonged motor life as just discussed. To this end, one specific implementation involves (among other things) the addition of a dedicated cache that acts as a buffer element of sorts for writing or obtaining data during a period when a motor may be spun down, especially (but not necessarily exclusively) in instances when a notebook needs to be running for a large portion of the day. Other analogous implementations are of course possible that would achieve similar ends. The use of the present invention is not limited to notebook computers, rather, the present invention may be used in any situation where there is concern with reducing power or allowing extended wear life.

In summary, one aspect of the invention provides a method comprising the steps of: developing a protocol for disk drive motor spin-down; and spinning down and spinning up a disk drive motor in accordance with the developed protocol; wherein the protocol takes into account historical disk drive or computer activity.

Furthermore, an additional aspect of the invention provides an apparatus comprising: an arrangement which accesses a protocol for disk drive motor spin-down; and an arrangement which spins down and spins up a disk drive motor in accordance with the protocol; wherein the protocol takes into account historical disk drive or computer activity.

Furthermore, an additional aspect of the invention provides a program storage device readable by machine, tangibly embodying a program of instructions executable by the machine to perform method steps, said method comprising the steps of: developing a protocol for disk drive motor spin-down; and spinning down and spinning up a disk drive motor in accordance with the developed protocol; wherein the protocol takes into account historical disk drive or computer activity.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

Figure 1:
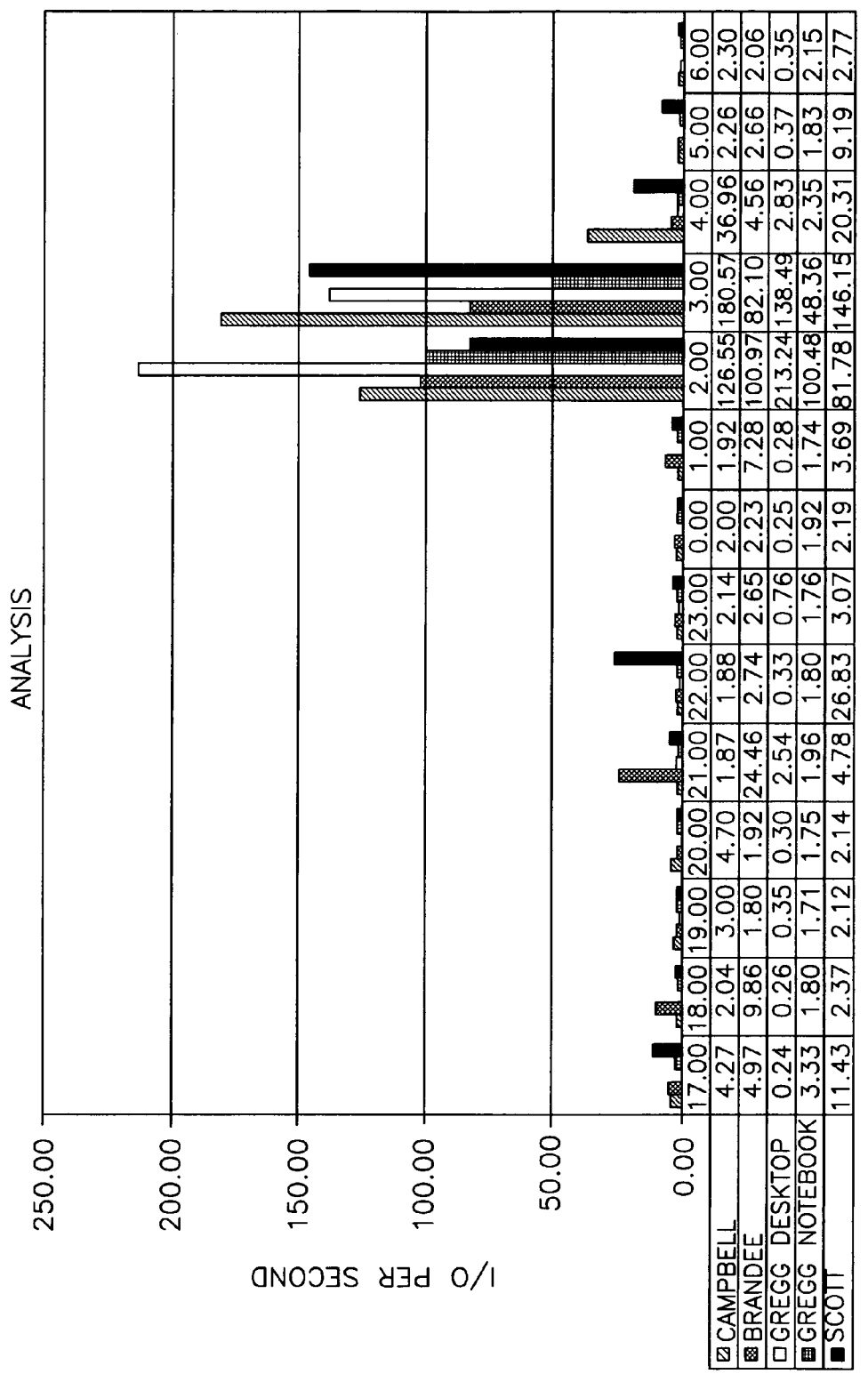
FIGS. 1 and 2 provide graphical data relating to known computer operating environments.
Figure 2:
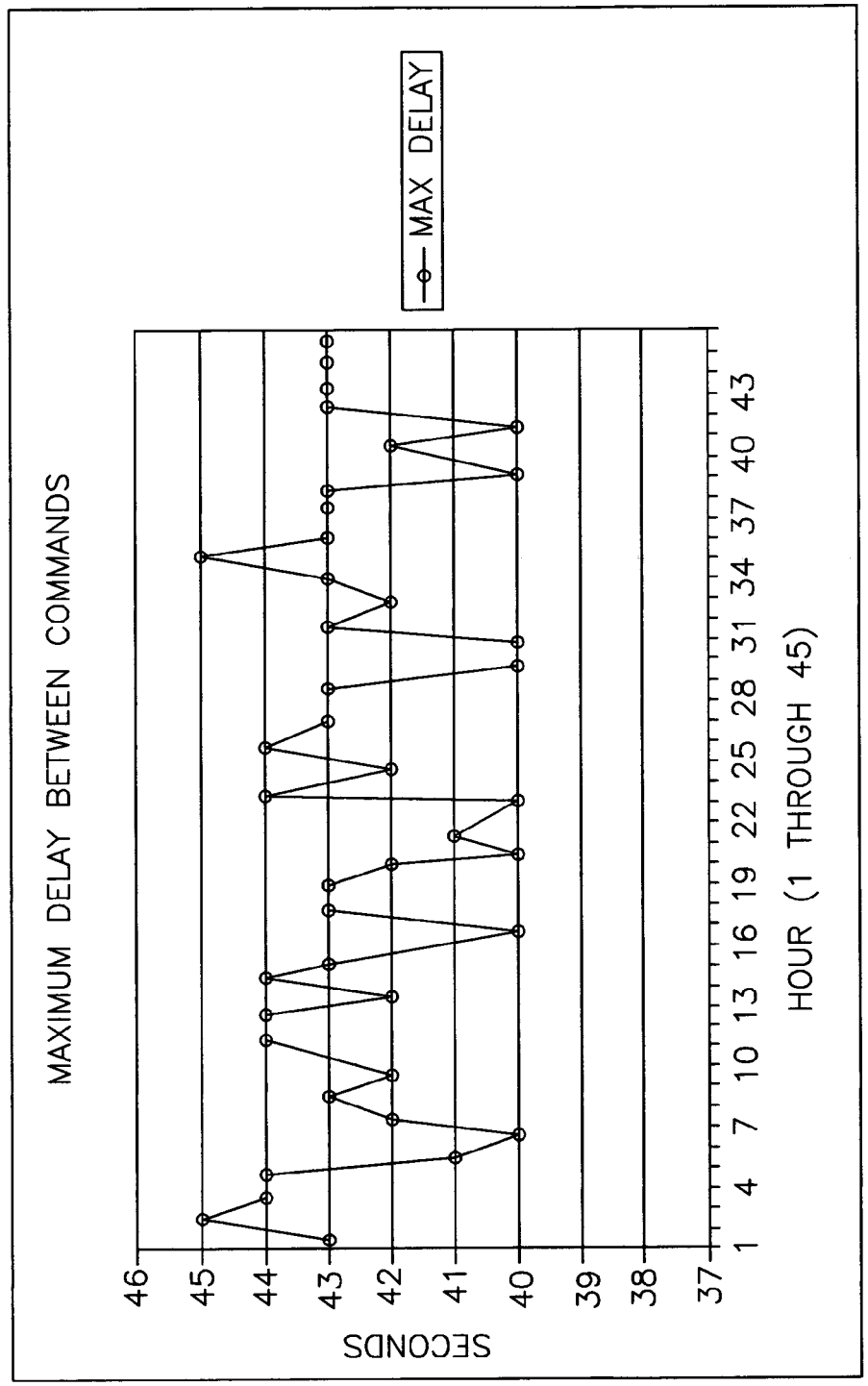

The demonstrable need for an evolved approach to spin-downs is illustrated by way of the graphs in FIGS. 1 and 2, which provide data collected from two sources by monitoring all hard disk drive activity for a period of time. It shows that the associated systems were operating in around-the-clock or 24×7 contexts but that in many cases the overall IOP rate is low.

Accordingly, FIG. 1 shows the number of input/output operations per second as broken down for each hour time interval for five users. From 2:00 to 3:00 am there is a scheduled virus scan, while other activity is simply "background"

in view of system applications that are running. Clearly, there is no time when the system is completely idle or permitted to stand by.

FIG. 2, for its part, shows data taken over 45 hours in the form of maximum delays between commands. As shown, the maximum delay for any given hour in which the system was running, was 45 seconds. Accordingly, within 45 hours of system run time there was never a period of more than 45 seconds where the HDD did not receive a new command, thus illustrating the difficulty of imposing any spin-down of any meaningful length.

Figure 3:
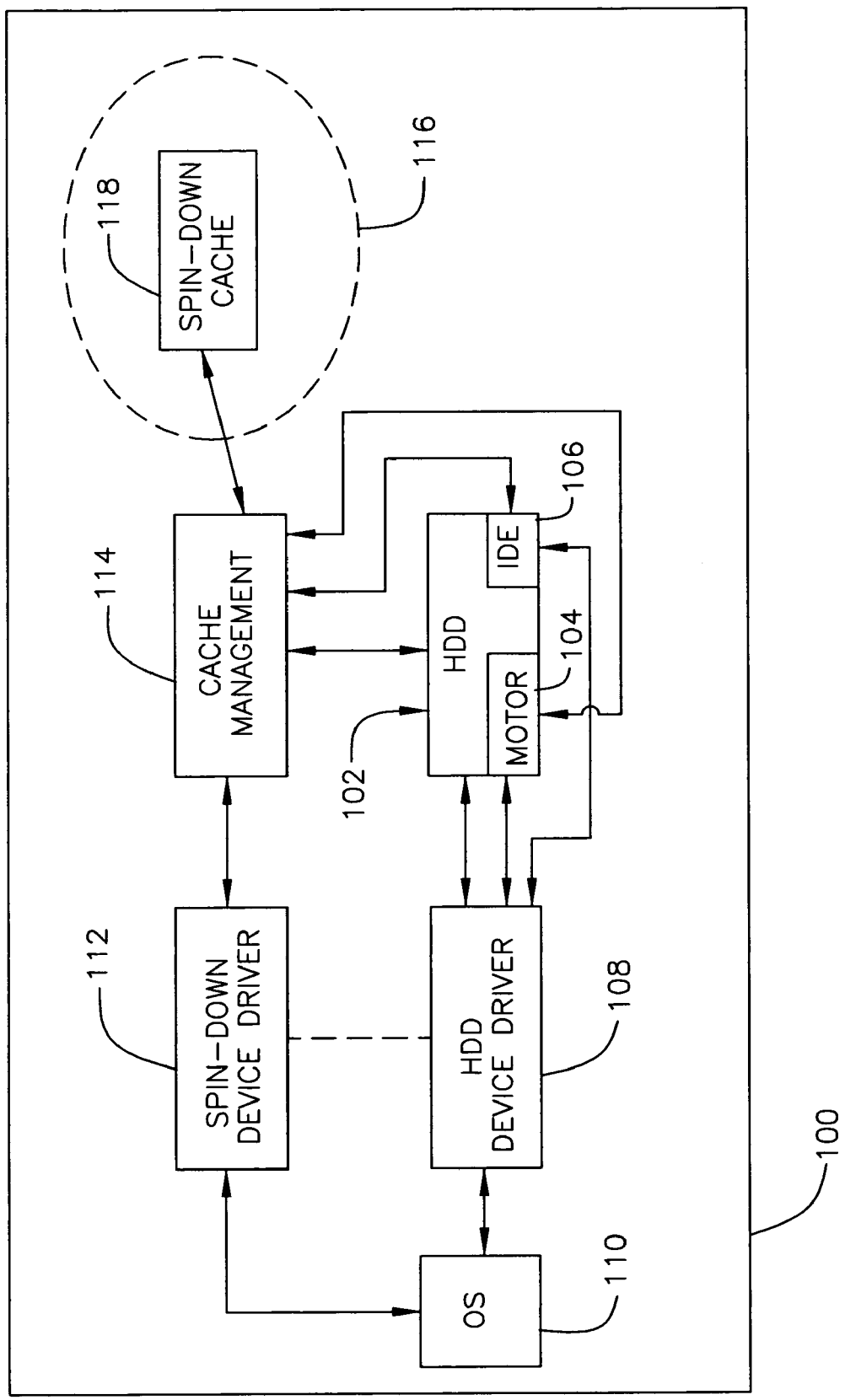
FIG. 3 schematically illustrates a computer with enhanced hard disk drive management.

FIG. 3 illustrates a computer (particularly notebook) 100 which, per normal, includes a hard disk drive (HDD) 102. HDD, for its part, is driven by a motor 104 and also includes an IDE (intelligent or integrated drive electronics) interface 106 for assisting in control of the motor 104 or other aspects of HDD 102. A HDD device driver 108, per usual, is in communication with the computer operating system (OS) 110 to control HDD 102 and components such as motor 104 and IDE 106.

In accordance with at least one presently preferred embodiment of the present invention, there is additionally provided a dedicated spin-down device driver 112 in communication with OS 110 which concertedly manages spin-downs of HDD 102 and motor 104 in a manner now to be described. This driver 112 is preferably configured to control a cache management protocol or software component 114 whereby, within the main memory 116 of the computer 100, a dedicated spin-down cache 118 is created. Spin-down device driver 112 is preferably in communication with HDD device driver 108, in a manner that will be appreciated, such that the former acts to manage the cache 118 at appropriate times and instances.

Essentially, cache 118 can take over command operations during low activity periods and can thus act as a buffer (effectively between HDD 102 and OS 110) to permit HDD 102 to go "unaccessed" for significant periods of time. Accordingly, this would permit spin-down times that should prove to be more than sufficient for prolonging HDD motor life as previously discussed. As such, cache management 114 is preferably configured such that the actual spin-down and spin-up of motor 104 can be concertedly and "smartly" controlled through IDE interface 106. The manner of controlling spin-down and spin-up can follow essentially any suitable or desired protocol but, in a preferred embodiment of the present invention, will be based on a relationship between cache miss activity and HDD activity. More particularly, spin-downs can be managed and controlled on the basis of historical spin down activity (e.g., within a predetermined time period) and/or general historical system activity or operation.

Management of cache 118 preferably proceeds such that, in essence, disk write activity is reduced. More particularly, all writes to HDD 102 are preferably "caught" by cache 118 and temporarily stored. Preferably, any reads from HDD 102 will be "checked" with cache 118 to determine if data is available without accessing the drive 102. In the case of a cache miss, the hard disk drive 102 would be spun up to retrieve data, which is then preferably stored in cache 118 to increase the potential of future cache hits. Read-ahead algorithms and other cache techniques to improve the hit percentage can also be utilized.

Spin-down times can vary but it is generally recognized that within a 24-hour period, 10 minutes total of spin-down is sufficient for prolonging motor life and avoiding the problems discussed previously.

Generally, by implementing a cache between a hard drive and the operating system as discussed, it is possible to drastically reduce hard drive traffic generated by low I/O, background applications. This result, combined with actively controlling the spin-up/spin-down capability of the hard drive 102, allows for long periods of motor spin down from what would have originally been 24×7 applications.

In a particularly preferred embodiment of the present invention, spin-downs are not managed by driver 112 and management protocol 114 haphazardly, but take into account current and historical spin-down or general activity, and weighing this against the total amount of time that the HDD 102 has been spun down within a predetermined (e.g., 24 hour) period. In this manner, excessive "thrashing" (i.e., frequent switches between spin-up and spin-down) can be avoided, to thus help minimize overall wear on motor 104.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The invention claimed is:

1. A method comprising the steps of:
   developing a protocol for disk drive motor spin-down; and
   spinning down and spinning up a disk drive motor in accordance with the developed protocol throughout a period of continuous operation;
   wherein the protocol takes into account historical disk drive or computer activity including frequency of input/output operations and duration of intervals between such operations.

2. The method according to claim 1, wherein the protocol takes into account at least one recent disk drive motor spin-down.

3. The method according to claim 2, wherein the protocol takes into account disk drive motor spin-down activity within a predetermined time period.

4. The method according to claim 1, wherein the protocol is applicable to constant computer activity over at least a 24-hour period.

5. The method according to claim 1, wherein said method comprises a method of managing a notebook computer disk drive.

6. The method according to claim 1, further comprising the steps of:
   creating a dedicated cache in computer memory;
   employing the dedicated cache to take over command operations during disk drive motor spin-down.

7. The method according to claim 6, wherein said step of employing the dedicated cache comprises:
   employing the dedicated cache to capture and store writes to a disk drive; and
   thereafter referring to the dedicated cache to determine if data is available without accessing a disk drive.

8. The method according to claim 7, further comprising the step of spinning up a disk drive to retrieve data in the event that data is not available from the dedicated cache; and thereafter storing in the dedicated cache data so retrieved.

9. An apparatus comprising:
   an arrangement which accesses a protocol for disk drive motor spin-down; and
   an arrangement which spins down and spins up a disk drive motor in accordance with the protocol throughout a period of continuous operation;
   wherein the protocol takes into account historical disk drive or computer activity including frequency of input/output operations and duration of intervals between such operations.

10. The apparatus according to claim 9, wherein the protocol takes into account at least one recent disk drive motor spin-down.

11. The apparatus according to claim 10, wherein the protocol takes into account disk drive motor spin-down activity within a predetermined time period.

12. The apparatus according to claim 9, wherein the protocol is applicable to constant computer activity over at least a 24-hour period.

13. The apparatus according to claim 9, wherein said apparatus comprises an arrangement which manages a notebook computer disk drive.

14. The apparatus according to claim 9, further comprising:
   a dedicated cache in computer memory;
   wherein the dedicated cache is employed to take over command operations during disk drive motor spin-down.

15. The apparatus according to claim 14, wherein the dedicated cache is employed to capture and store writes to a disk drive; and
   thereafter the dedicated cache is referred to determine if data is available without accessing a disk drive.

16. The apparatus according to claim 15, further comprising spinning up a disk drive to retrieve data in the event that data is not available from the dedicated cache; and thereafter storing in the dedicated cache data so retrieved.

17. A program storage device readable by machine, tangibly embodying a program of instructions executable by the machine to perform method steps, said method comprising the steps of:
   developing a protocol for disk drive motor spin-down; and
   spinning down and spinning up a disk drive motor in accordance with the developed protocol throughout a period of continuous operation;
   wherein the protocol takes into account historical disk drive or computer activity including frequency of input/output operations and duration of intervals between such operations.

* * * * *